May 21, 1929.                E. A. SPERRY, JR                1,713,929
                          AUTOMATIC PROJECTOR LAMP
                  Filed Jan. 26, 1921         2 Sheets-Sheet 1
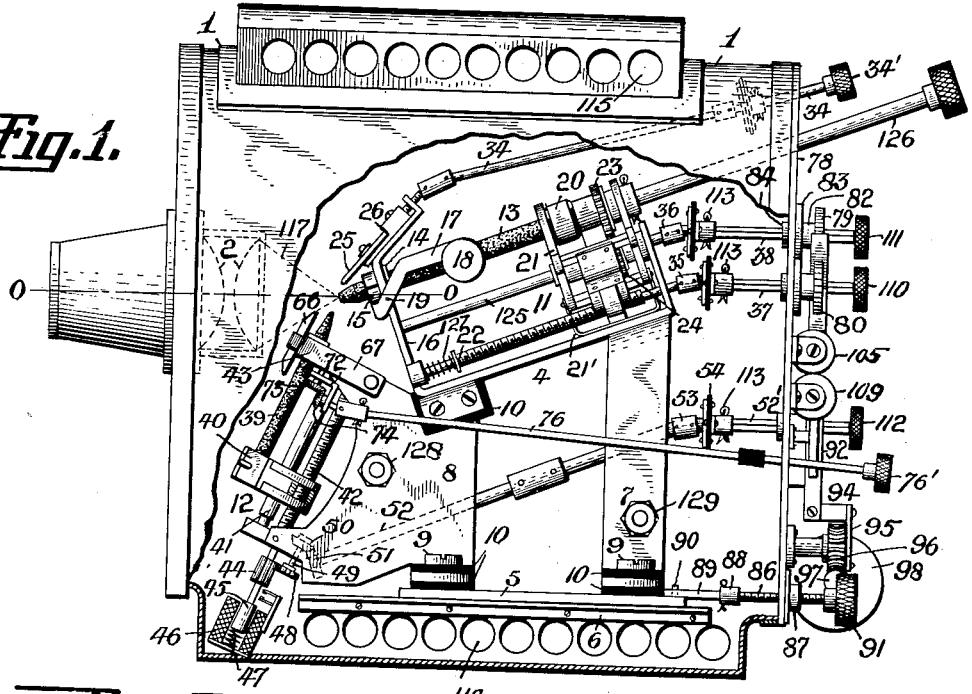
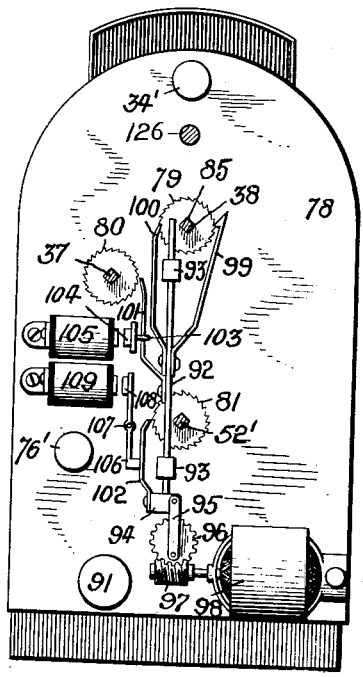
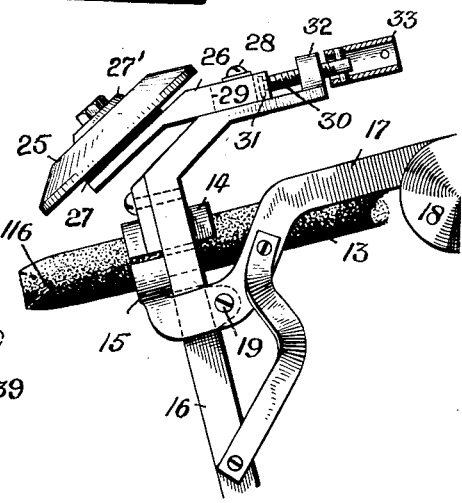
Inventor
ELMER A. SPERRY, JR.
By his Attorney
Herbert H. Thompson May 21, 1929.  E. A. SPERRY, JR  1,713,929
AUTOMATIC PROJECTOR LAMP
Filed Jan. 26, 1921   2 Sheets-Sheet 2
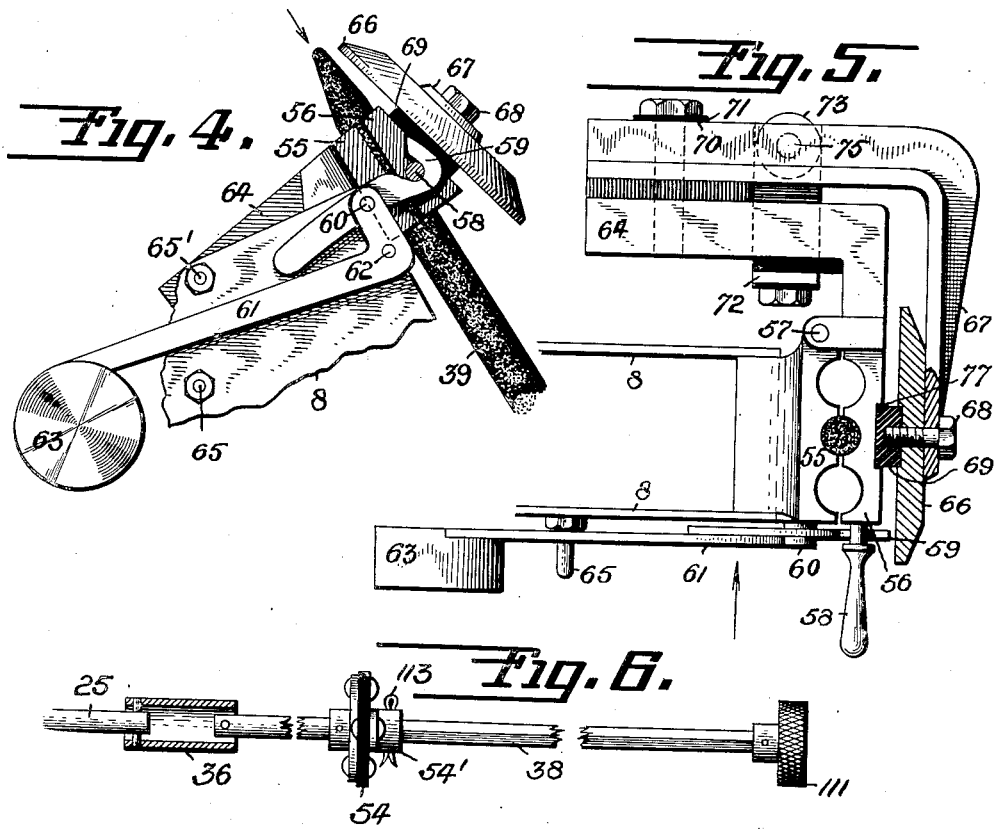
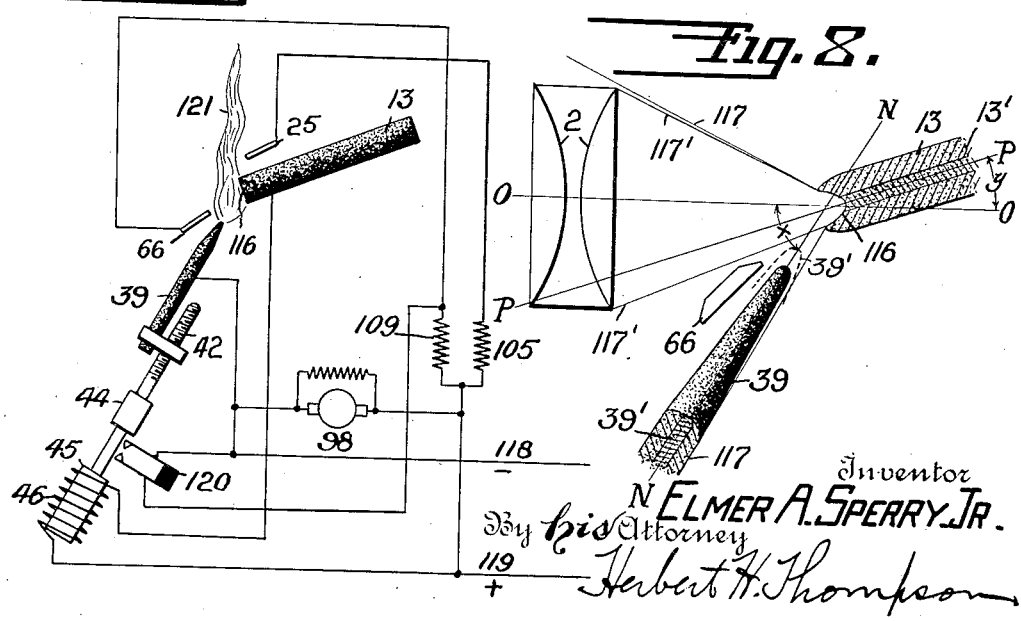
Inventor
N. ELMER A. SPERRY, JR.
By his Attorney
Herbert H. Thompson Patented May 21, 1929.

1,713,929

UNITED STATES PATENT OFFICE.

ELMER A. SPERRY, JR., OF BROOKLYN, NEW YORK, ASSIGNOR, BY MESNE ASSIGNMENTS, TO SPERRY GYROSCOPE COMPANY, INC., A CORPORATION OF NEW YORK.

AUTOMATIC PROJECTOR LAMP.

Application filed January 26, 1921. Serial No. 439,982.

This invention relates to projector lamps especially adapted for the projection of motion pictures.

The principal object of the invention is to produce an automatically operated and controlled high power arc lamp of hardy construction and a high degree of reliability.

Another object is to provide a method and means whereby the arc may be struck automatically without chipping the edge of the crater of the positive electrode.

A further object is to provide a lamp wherein the more delicate parts are removed from the heated interior of the lamp house.

Other objects will appear throughout the following description of the invention.

Referring to the drawings wherein I have shown what I now consider to be the preferred form of my invention:

Fig. 1 is a side elevation of a lamp house containing the lamp mechanism, a portion of the house being cut away to show the mechanism.

Fig. 2 is a rear elevation of the lamp house showing the control mechanism.

Fig. 3 is a detail of the positive electrode holder and including the third electrode for controlling the position of the electrode tip.

Fig. 4 is a detail view of the negative electrode holder with the fourth electrode for controlling the position of the negative electrode tip.

Fig. 5 is another view of the negative electrode holder looking in the direction of the arrow in Fig. 4.

Fig. 6 is a detail of the actuating rods for operating the mechanism of the lamp.

Fig. 7 is a wiring diagram.

Fig. 8 is a diagrammatic representation of the relative positions of the electrodes and the optical system.

The method whereby the light is controlled may be in accordance with United States Letters Patent No. 1,227,210 Elmer A. Sperry for method of operating flaming arc lights for projectors, dated May 22, 1917, or U. S. Letters Patent, "Concentrated flaming arc lamp for projectors," of Preston R. Bassett, #1,-428,510, patented Sept. 5, 1922.

In the drawings the lamp house is shown at 1 and is provided with an optical system or objective 2 with an axis O—O. Within the lamp house is shown the lamp mechanism 4 comprising a base 5 mounted on guideways 6 and adapted to move forwardly and backwardly thereon. Rising from said base are standards 7, 8 secured thereto by screws 9 and insulated therefrom and from each other by insulation 10. Supported by said standards are the positive and negative electrode operating mechanisms 11, 12. These mechanisms may be substantially the same as disclosed in U. S. Letters Patent to Theodore Hall, #1,679,718, patented August 7, 1928, and need not be minutely described here.

The positive electrode 13 is gripped near its forward end between a pair of guide brushes 14, 15 and positioned with its burning tip or crater 116 in the axis of the optical system. Brush 14 may be rigidly secured to frame 16, while brush 15 may be integral with an arm 17 provided with a weight 18 at its other end, and pivoted at 19 to frame 16 (see also Fig. 3). The gravitational effect of the weight upon lever 17 about pivot 19 will serve to press the brush firmly against the electrode to insure good electrical contact, while the lever and weight will also serve to conduct heat away from the brush. The rear end of the electrode may be held in a rotatable portion 20 of a carriage 21. Said carriage is provided with threaded engagement with screw 22 so that rotation of the screw will advance the carriage to feed the electrode through brushes 14, 15. The rotatable portion 20 may also carry a gear 23 meshing with a gear 24 splined on rod 125, as more specifically shown in the aforesaid applications, so that rotation of the rod will effect rotation of the electrode. The carriage may be provided with a brush 21' engaging frame 16 to further insure good electrical contact between the frame and the electrode.

Adjacent the tip of the positive electrode is positioned the third electrode 25 secured to an adjustable member 26 and insulated therefrom by insulation 27. Member 26 is attached by means of a screw 28 through slot 29 to frame 16. A rod 30 having a head 31 rotatably lodged in member 26 may have threaded engagement with frame 16 at 32 (see also Fig. 3). Rotation of said rod will thus move member 26 to vary the position of the third electrode 25. Rod 30 may be connected by a universal joint 33 to a rod 34 extending without the lamp house and provided with a knob 34' for adjusting the third electrode while the lamp is in operation. Rods 22 and 125 may also be connected by universal joints 35, 36 and through insulating members to extension rods 37, 38 reaching outside of the lamp house.

The negative electrode 39 may be gripped by a suitable clamp 40 slidably mounted on a guide rod 41 and threaded to the feeding rod 42. Rotation of rod 42 will move electrode 39 through the guide 43 toward or away from electrode 13. The lower end of rod 42 may be provided with an elongated pinion 44 and a core 45 working in a solenoid 46 against the action of a spring 47. Pinion 44 meshes with a pinion 48 on the same shaft 49 as bevel gear 50 which in turn meshes with bevel gear 51 on a shaft 52 having a universal joint at 53 and insulated at 54 and reaching outside of the drum. Rotation of rod 52 will thus act to feed the negative electrode.

The forward end of this electrode may be held in position by guide jaws 55, 56 best seen in Fig. 4 which is an enlarged detail showing the opposite side of the electrode from that shown in Fig. 1 and in Fig. 5. As seen in these views the lower jaw 55 is fixed to upright members 8, while the upper jaw 56 is hinged at 57 to the lower jaw, thus permitting opening of the jaws for the insertion of the electrode. Jaw 56 may be provided with a peg 58 shown in Fig. 5 in the form of a handle. A latch 59 which may be pivotally attached at 60 to bell crank lever 61 may serve to hold the jaws in closed position. The bell crank lever is pivotally attached at 62 to the upright 8 and has at its outer end a weight 63. The action of the weight and lever upon the latch will be to hold the jaws tightly but resiliently closed over the electrode to insure good electrical contact between the jaws which also act as brushes and the electrode, without preventing the electrode from being fed through the jaws. By constructing the latch in this manner it may be operated without swinging the weight through a wide angle. When the parts are unlatched the lever may rest on the pin 65 in upright 8 and may be prevented from excessive upward turning by a pin 65'. In order that the jaws shall not be distorted or otherwise destroyed by the intense heat they are preferably made of heavy material and the upper jaw may be provided with a heavy projection 64 which will serve to conduct the heat away from the immediate vicinity of the electrode.

Adjacent the tip of the negative electrode is positioned what may be termed a fourth electrode 66 for controlling the position of said tip. The electrode 66 is secured to an arm 67 by a screw 68 and is prevented from touching the jaw 56 by a block of insulation 69. The arm 67 may be secured to the extension 64 of the jaw 56 by a screw or bolt 70 but insulated therefrom by insulation 71; the connection being sufficiently loose to permit the arm to rotate easily upon bolt 70 as a pivot. Attached to extension 64 is a bracket 72 carrying intermeshing bevel gears 73, 74. The shaft 75 of bevel gear 73 may be adapted to rotate but not to move longitudinally in said bracket, and may be loosely threaded into arm 67, so that rotation of the bevel gears will cause the arm to rotate on bolt 70. The looseness of the threaded connection between the shaft of gear 73 and arm 67 will permit the small degree of movement of the arm desired without binding. This operation may be effected through rod 76 having a knob 76' and serves to adjust the fourth electrode (the insulation block 69 sliding through a groove 77 in jaw 56), to vary the position at which the tip of the negative electrode is maintained. This in turn will effect an adjustment of the arc length.

As shown in Figs. 1 and 2 the delicate parts of the mechanism, such as the pawls, ratchets, electromagnets and operating motor are placed on the outside of the lamp house so as to be removed from the heat caused by the arc within the house. These parts may be arranged on a plate which may be screwed to the back of the house, or they may be carried directly by the house. They are shown here as attached directly to the back panel 78 of the lamp house. Thus the ratchets 79, 80, 81 may be formed integral with a member 82 having a flange 83 bearing against the outside of said panel and a flange 84 on the inside of the panel. A square hole 85 may be provided through the entire member for the square rods 38, 37, and 52'. The said rods are thus adapted to slide through the ratchets to permit adjustment of the lamp within the lamp house in focusing. This adjustment may be effected by means of a screw 86 having threaded connection at 87 with the panel 78 and rotatable connection at 88 with a link 89 connected at 90 to the base 5 of the lamp. Rotation of the screw head 91 will thus move the lamp toward or away from the lens system.

Adjacent the ratchets is a reciprocatory rod 92 in bearings 93 attached to the panel. The lower end of this rod may be fixed to a block 94 to which is attached a pitman 95. The pitman is also attached to a worm wheel 96 meshing with a worm 97 on the shaft of the motor 98. Attached to rod 92 and block 94 are pawls 99, 100, 101, and 102. Pawls 99, 100 engage ratchet 79 to rotate the latter during each reciprocatory movement of the rod to rotate the positive electrode 13. Pawl 101 is normally disengaged from ratchet 80 during its reciprocatory motion but moves through a hook or loop 103 attached to the armature 104 of the third electrode magnet 105, so that when said magnet is energized the pawl 101 will be moved into engagement with ratchet 80 to actuate the same during its upward stroke to effect the feeding of the positive electrode. Pawl 102 in like manner is normally disengaged from ratchet 81, but is engaged by a lever 106 pivoted at 107 and provided with an armature 108 for the fourth electrode magnet 109. When this magnet is energized the pawl will be moved into engagement with ratchet 81 to effect the feeding of the negative electrode. The pawls are obviously all of resilient material.

For manual control of the lamp, rods 37, 38, and 52' may be provided with knobs 110, 111, and 112, respectively.

In order that the lamp may readily be taken out of the lamp house I have shown means for disconnecting the control rods which project without the house from the lamp proper. Thus as more clearly shown in Fig. 6 I may connect rod 38 to the insulated element 54' by means of a cotter or other pin 113 which may readily be removed.

Ventilation of the lamp house is effected by the inflow of air through holes 114 at the lower part of the house and the outflow of the hot gases through holes 115 at the top.

As will be observed the lamp mechanism is tilted so that instead of the positive electrode axis P—P being coincident with the axis O—O of the optical system it is inclined thereto (see also Fig. 8). The advantage of this is that the positive and negative electrodes may be placed at the proper distance and angles with respect to each other without the negative electrode and its auxiliary control electrode being in such position as to cut off the light from the condenser lenses. By positioning the electrodes as shown I am able to operate the arc in accordance with the aforesaid Sperry patent and Bassett application and to cause a deep crater 116 to form in the positive electrode which will emit a cone 117 of intense light having its axis coincident with the axis P—P of said electrode. It will then be seen that the lenses 2 are positioned in the upper portion of this light cone, or in other words, principally on the opposite side of axis P—P to that occupied by the negative electrode 39. The lenses then subtend a cone 117' of light included within the cone 117, and this constitutes the effective portion of the light emitted. This effective cone of light is very bright and of a comparatively high degree of uniform intensity. As will be seen, the fourth or control electrode 66 and the negative electrode 39 are positioned without the cone of light subtended by the optical system, and the negative electrode is shown as having its longitudinal axis N—N at an angle to the axis P—P of the positive electrode and also tilted at a greater angle $x$ to the optical axis O—O than the angle $y$ between the axes P—P and O—O.

Fig. 8 also shows the positive and negative electrodes as provided with cores 13' and 39'. The core 13' is preferably of light producing materials, while the core 39' is preferably of arc sustaining materials.

Fig. 8 shows the negative electrode tip positioned with respect to the crater 116 for the longer type of arc disclosed by said patent to Sperry, while the dotted line position 39$^a$ of the negative tip shows that the shorter type of arc as disclosed by said Bassett application may also be used without the electrode reaching into the cone 117' of light.

Referring to the wiring diagram in Fig. 7, the current supply lines are shown at 118, 119. When the current is turned on it is desired that the arc shall be automatically struck between the electrodes and the electrodes properly positioned. Solenoid 46 is shown in series with electrodes 13, 39 and the supply lines so that when there is no arc the solenoid will be deenergized and spring 47 will move feed rod 42 longitudinally to move electrode 39 toward electrode 13. This, of course, takes place whenever the current is turned off. I prefer, however, that the negative electrode shall not be moved far enough to touch the positive as the shock of the contact under the thrust of spring 47, especially when the positive electrode is hot, is apt to chip the crater edge, resulting in an unsteady arc for a period when the arc is again turned on. The distance through which screw 42 may move under the pressure of spring 47 is thus limited so that the negative electrode will be carried almost but not quite to the tip of the positive.

To this end the armature 45 may engage a switch 120. This will stop screw 42 and at the same time close the switch. Thus when the current is turned on again it will flow through motor 98 and also across switch 120 and through electromagnet 109. This will set in operation the mechanism for rotating the positive electrode and will cause pawl 102 to engage ratchet 81 to feed the negative electrode gently into contact with the positive, whereupon solenoid 46 will become energized and the negative electrode will be retracted to draw the arc. Switch 120 will then open by reason of its resilient nature and magnet 109 will become deenergized. As the negative electrode becomes consumed the flame 121 will recede and engage the fourth electrode 66 closing a circuit from the positive line 118 through magnet 109, the fourth electrode 66, the flame 121, the negative electrode 39 to the negative line 119. Magnet 109 thus becomes energized and causes the negative electrode to feed. In this way the arcing tip of the negative electrode is maintained at a substantially fixed point. Similarly, as the arcing end of the positive electrode is consumed the flame 121 will spread and engage the third electrode 25, closing a circuit from the positive line 119 through magnet 105, the third electrode 25, the flame 121, the negative electrode 39, and back through negative line 118, and the energization of magnet 105 will cause the positive electrode 13 to feed. This will hold the crater 116 at the fixed focal point and in the axis 3 of the lens system.

It will be seen that if the spring 47 (Fig. 1) does not move the negative electrode quite into contact with the positive and the negative is fed the remaining distance by rotation of feed rod 42, when the arc is struck the negative will not be drawn back to the point which it occupied during previous operation, or in other words to its proper position. The difference, however, is so slight that no noticeable difference will be observed in the light, and the arc will soon burn it back to its proper working point before the fourth electrode acts to maintain it there.

In order that the arc may be struck manually if desired a rod 126 may be attached to carriage 21. As shown here the connection is directly to the rotatable portion 20. By pushing longitudinally upon this rod the carriage will be slid along rod 125 carrying with it screw rod 22, the latter moving longitudinally through its bearings in frame 16 against the action of spring 127 so that when the rod 126 is released the carriage will return to its original position. By this means the positive electrode may be thrust into contact with the negative and returned to its working position. It will also be seen that rotation of rod 126 will effect the rotation of the positive electrode.

Current may be introduced into the lamp by connecting the feed wires to binding posts 128, 129.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a projector lamp, an objective, a positive electrode positioned at an angle to the axis of said objective and having means whereby it is adapted to burn with a deep crater to produce a cone of bright light, said objective being within said cone and chiefly to one side of the cone axis, a negative electrode positioned at an angle to said objective axis and on the opposite side of said cone axis to said objective.

2. In a projector lamp, an objective, a positive electrode having means whereby it is adapted to burn with a deep crater to produce a cone of bright light directed toward said objective, said electrode being disposed at an angle to the axis of said objective, said objective being positioned within said cone and to one side thereof, a negative electrode associated with said first mentioned electrode, and an auxiliary electrode mounted adjacent said negative electrode, said negative and auxiliary electrodes being disposed at such an angle to said objective axis that said negative and auxiliary electrodes are outside the path of light intercepted by said objective.

3. In a projector lamp, a positive electrode adapted to burn with a crater emitting a cone of light, an objective positioned within said cone of light, a negative electrode, an auxiliary electrode mounted adjacent said negative electrode, and means for maintaining said negative and auxiliary electrodes at such an angle to the positive electrode that said electrodes are outside the portion of said cone of light intercepted by said objective.

4. In a projector lamp, an objective, a positive electrode adapted to burn with a crater emitting a cone of light, a negative electrode, an auxiliary electrode mounted adjacent said negative electrode, and means for maintaining said negative and auxiliary electrodes at such an angle to the positive electrode that said electrodes are outside the path of light intercepted by said objective.

5. In a projector lamp having an optical axis, a positive electrode adapted to burn with a crater emitting a cone of light, an objective positioned within said cone of light, means for positioning said electrode inclined to said axis, and with its tip in said axis, a negative electrode, an auxiliary electrode mounted adjacent said negative electrode, and means for maintaining said negative and auxiliary electrodes inclined to said axis sufficiently to maintain said negative and auxiliary electrodes outside the portion of said cone of light intercepted by said objective.

6. In a projector lamp having an optical axis, a positive electrode adapted to burn with a crater emitting a cone of light, an objective positioned within said cone of light, means for positioning said electrode inclined to said axis and with its tip in said axis, a negative electrode, an auxiliary electrode mounted adjacent said negative electrode, and means for maintaining said negative and auxiliary electrodes inclined to said axis at a greater angle than said positive electrode sufficiently to maintain said negative and auxiliary electrodes outside the portion of said cone of light intercepted by said objective.

7. In a projector lamp, an objective, a postive electrode adapted to burn with a crater emitting a cone of light, means for positioning said electrode inclined to the axis of said objective and with its tip in said axis, a negative electrode, an auxiliary electrode mounted adjacent said negative electrode, and means for maintaining said negative and auxiliary electrodes inclined to said axis sufficiently to maintain said negative and auxiliary electrodes outside the path of light intercepted by said objective.

8. In a projector lamp, an objective, a positive electrode adapted to burn with a crater emitting a cone of light, means for positioning said electrode inclined to the axis of said objective and with its tip in said axis, a negative electrode, an auxiliary electrode mounted adjacent said negative electrode, and means for maintaining said negative and auxiliary electrodes inclined to said axis at a greater angle to said axis than said positive electrode and sufficiently to maintain said negative and auxiliary electrodes outside the path of light intercepted by said objective.

9. In a projector lamp having an optical axis, a positive electrode adapted to burn with a crater emitting a cone of light, an objective positioned within said cone of light, means for positioning said electrode inclined to said axis and with its tip in said axis, a negative electrode, an auxiliary electrode mounted adjacent said negative electrode, and means for maintaining said negative and auxiliary electrodes inclined to said axis on the opposite side of said optical axis to said positive electrode and sufficiently to maintain said negative and auxiliary electrodes outside the portion of said cone of light intercepted by said objective.

10. In a projector lamp having an optical axis, a positive electrode adapted to burn with a crater emitting a cone of light, an objective positioned within said cone of light, means for positioning said electrode inclined to said axis and with its tip in said axis, the angle of inclination of said positive electrode being less than the angle subtended by said cone, a negative electrode, an auxiliary electrode mounted adjacent said negative electrode, and means for maintaining said negative and auxiliary electrodes inclined to said axis sufficiently to maintain said negative and auxiliary electrodes outside the portion of said cone of light intercepted by said objective.

11. In an arc lamp adapted to employ a positive and a negative electrode, means for moving one of said electrodes toward the other when the current is turned off, and means for causing said electrodes to engage each other when the current is turned on.

12. In an arc lamp adapted to employ a positive and a negative electrode, means for moving one of said electrodes toward the other when the current is turned off, means for causing the electrodes to engage each other when the current is turned on, and means brought into action when the electrodes engage each other for drawing them apart to strike the arc.

13. In an arc lamp adapted to employ a positive and a negative electrode, means for moving one of said electrodes toward the other when the current is turned off, means for causing the electrodes to engage each other when the current is turned on, means brought into action when the electrodes engage each other for drawing them apart to strike the arc, and means for thereafter maintaining the electrodes in substantially fixed positions.

14. In an arc lamp adapted to employ a positive and a negative electrode, automatic feeding means for each electrode, means brought into action when the current is turned off for thrusting one electrode toward the other, means brought into action when the current is turned on for causing actuation of the feeding means of said one of said electrodes, and means operative when the electrodes engage each other for drawing them apart.

15. In an arc lamp, a positive and a negative electrode, separate means controlled by the position of each electrode for feeding the same, separate means for effecting actuation of one of said feeding means when the current is turned on, and means actuated when the electrodes engage each other for striking the arc and for rendering said separate means inoperative.

16. In a projector arc lamp, a housing, a positive and a negative electrode therein, an electrode feeding mechanism within said housing, an auxiliary electrode adjacent said positive electrode, an auxiliary electrode adjacent said negative electrode, said auxiliary electrodes controlling said feeding mechanism, and means operable from without the housing for adjusting each of said auxiliary electrodes to adjust the length and position of the arc.

17. In a projector arc lamp, a housing, a negative electrode therein, an electrode feeding mechanism, a pivoted member, an auxiliary electrode carried by said member adjacent said first electrode for controlling said feeding mechanism, and means operable from without the housing for operating said member about its pivot to adjust said auxiliary electrode toward or away from the tip of said first electrode.

18. In a projector arc lamp, a housing, an electrode therein, an electrode feeding mechanism, a member pivoted for movement in a plane parallel to the axis of said electrode, an auxiliary electrode carried by said member adjacent said first electrode for controlling said feeding mechanism, and means including a shaft operable from the outside of the housing and gearing between said shaft and said member for operating said member about its pivot to adjust said auxiliary electrode toward or away from the tip of said first electrode.

19. In an arc lamp, an electrode, a holder for said electrode comprising a pair of relatively movable, cooperating jaws adapted to engage said electrode therebetween, and a latch pivoted on one jaw and engaging the other jaw for locking said jaws together.

20. In an arc lamp, an electrode, a holder for said electrode comprising a pair of relatively movable, cooperating jaws adapted to engage said electrode therebetween, a latch pivoted on one jaw and engaging the other jaw for locking said jaws together, and means including a weight for maintaining said latch normally in locking position.

In testimony whereof I have affixed my signature.

ELMER A. SPERRY, Jr.